United States Patent
Vogel

(10) Patent No.: US 7,488,760 B2
(45) Date of Patent: Feb. 10, 2009

(54) PROCESS FOR SEPARATING A CATALYST FROM A LIQUID

(75) Inventor: Alex Philip Vogel, Three Rivers (ZA)

(73) Assignee: Sasol Technology (Proprietary) (Limited), Johannesburg (ZA)

(*) Notice: Subject to any disclaimer, the term of this patent is extended or adjusted under 35 U.S.C. 154(b) by 243 days.

(21) Appl. No.: 10/564,705

(22) PCT Filed: Jul. 9, 2004

(86) PCT No.: PCT/IB2004/002243

§ 371 (c)(1),
(2), (4) Date: Jun. 2, 2006

(87) PCT Pub. No.: WO2005/005038

PCT Pub. Date: Jan. 20, 2005

(65) Prior Publication Data
US 2007/0197667 A1 Aug. 23, 2007

(30) Foreign Application Priority Data
Jul. 15, 2003 (ZA) ................. 2003/5452

(51) Int. Cl.
*C07C 27/00* (2006.01)
(52) U.S. Cl. ................. 518/700; 518/715
(58) Field of Classification Search ............. 518/700, 518/715
See application file for complete search history.

(56) References Cited

U.S. PATENT DOCUMENTS

| 5,527,473 | A | | 6/1996 | Ackerman |
| 5,811,469 | A | * | 9/1998 | Leviness et al. ............. 518/700 |
| 5,844,006 | A | | 12/1998 | Jager et al. |
| 2002/0035163 | A1 | * | 3/2002 | Vogel et al. ................. 518/728 |

FOREIGN PATENT DOCUMENTS

| EP | 0 609 079 A1 | 8/1994 |
| WO | 00/45948 | 8/2000 |
| WO | 03/047741 A1 | 6/2003 |

* cited by examiner

*Primary Examiner*—Jafar Parsa
(74) *Attorney, Agent, or Firm*—Ladas & Parry LLP

(57) ABSTRACT

Gaseous reactants (18) are fed into a slurry bed (14) of solid catalyst particles in a liquid. The reactants react as they pass upwardly through the bed, thereby forming liquid and gaseous products. In a primary filtration stage (30), the liquid product passes through a filtering medium having filtering openings, which have a controlling dimension of x microns, so that large catalyst particles greater than x microns are removed. A primary filtrate containing near-size and fine catalyst particles is subjected to secondary filtration (64) to remove near-size particles. A cake of catalyst particles forms on the filtering medium. The passage of liquid product through the filtering medium is interrupted, and the filtering medium is backflushed by passing secondary filtrate through it in a reverse direction, to dislodge the cake from the filtering medium.

26 Claims, 2 Drawing Sheets

PROCESS FOR SEPARATING A CATALYST FROM A LIQUID

THIS INVENTION relates to a process for producing liquid and, optionally, gaseous products from gaseous reactants.

According to the invention, there is provided a process for producing liquid and, optionally, gaseous products from gaseous reactants, which process includes feeding, at a low level, gaseous reactants into a slurry bed of solid catalyst particles suspended in a suspension liquid;

allowing the gaseous reactants to react as they pass upwardly through the slurry bed, thereby to form liquid and, optionally, gaseous products, with the reaction being catalyzed by the catalyst particles and with a product mixture comprising liquid product and catalyst particles having a range of sizes, being formed;

subjecting, in a primary filtration stage, the product mixture to primary filtration by passing the liquid product through a filtering medium having a plurality of filtering openings through which the liquid product passes, with the liquid product passing through the filtering openings in a first direction and with the filtering openings having a controlling dimension of x microns, so that large catalyst particles having a particle size greater than x microns are separated from the liquid product, thereby to obtain a primary filtrate comprising liquid product, near-size catalyst particles, and fine catalyst particles;

subjecting, in a secondary filtration stage, the primary filtrate to secondary filtration to separate the near-size catalyst particles and, optionally, some of the fine catalyst particles, from liquid product, thereby to obtain a secondary filtrate comprising liquid product and, optionally, fine catalyst particles;

allowing a cake of catalyst particles to build up on the filtering medium in the primary filtration stage;

from time to time interrupting the passage of liquid product through the filtering medium in the primary filtration stage; and backflushing the filtering medium by passing secondary filtrate, as a flushing liquid, through the filtering medium in a second direction, opposite to the first direction, for at least portions of the periods that the liquid product passage is interrupted, thereby to dislodge the cake from the filtering medium.

While the process can, at least in principle, have broader application, it is envisaged that the suspension liquid will normally, but thus not necessarily always, be the liquid product.

Furthermore, while it is also believed that, in principle, the process can have broader application, it is envisaged that it will have particular application in hydrocarbon synthesis where the gaseous reactants are capable of reacting catalytically in the slurry bed to form liquid hydrocarbon product and, optionally, gaseous hydrocarbon product. In particular, the hydrocarbon synthesis may be Fischer-Tropsch synthesis, with the gaseous reactants being in the form of a synthesis gas stream comprising mainly carbon monoxide and hydrogen, with both liquid and gaseous hydrocarbon products being produced, and with the catalyst particles thus being Fischer-Tropsch catalyst particles.

The slurry bed will thus be provided in a suitable vessel, eg a column, which thus constitutes a reactor, with unreacted reactants and gaseous product being withdrawn from the vessel above the slurry bed. The vessel will be maintained at normal elevated pressure and temperature conditions associated with Fischer-Tropsch synthesis, eg a predetermined operating pressure in the range 10 to 50 bar, and at a predetermined temperature in the range 180° C. and 280° C., or even higher for the production of lower boiling point product.

The catalyst particles can, at least in principle, be any desired Fischer-Tropsch catalyst, such as an iron-based catalyst, a cobalt-based catalyst, or any other Fischer-Tropsch catalyst. Supported catalysts, which are physically stronger than unsupported catalysts, are typically used.

The large catalyst particles in the slurry bed thus have particle sizes greater than x microns. The near-size or near-gap size catalyst particles have sizes smaller than x microns, but close to x microns, and are typically not smaller than 1 micron. Thus, the near-size catalyst particles can range in size from 1 micron to about x microns. Near-size catalyst particles are thus prone to causing blockage or blinding of the filtering medium in the primary filtration stage, especially during the backflushing thereof. Such blinding can occur when individual catalyst particles become wedged in a filtering opening of the filtering medium. In addition, blinding can occur when a number of catalyst particles are, during backflushing, together forced into a filtering opening of the filtering medium, thereby bridging the filtering opening. The fine catalyst particles are significantly smaller than x microns, and are typically smaller than 1 micron. When the catalyst is a cobalt-based catalyst, the catalyst inventory in the slurry bed typically comprises less than 5 volume % particles smaller than 45 $\mu$m and typically less than 1 volume % particles smaller than 22 $\mu$m. In a specific application, the slurry bed catalyst inventory may comprise less than 6 volume % particles smaller than 44 $\mu$m and typically less than 3 volume % particles smaller than 22 $\mu$m, when the catalyst is a cobalt-based catalyst.

It will be appreciated that there will normally be some overlap between the particle sizes in the various categories. The catalyst particles will normally be more-or-less spherical so that the particle sizes are thus the diameters of the particles.

The catalyst particles may have a desired particle size range. Thus, there may be no particles greater than 300 microns, or even no particles greater than 250 microns. Less than 5% by mass, or even less than 3% by mass, of the catalyst particles may be smaller than 22 microns. The catalyst particle size range may be selected, bearing in mind the filtering medium. Conversely, the filtering medium may be selected bearing in mind the catalyst particle size range.

Generally, the controlling dimension of the filtering openings, ie x, may be up to 70 microns; however, normally it will be less than 70 microns, and may thus be 55 microns or less, such as 45 microns or even 10 microns.

The controlling dimension, ie x, of the filtering openings is typically 25 microns for an iron-based Fischer-Tropsch catalyst, and typically 10 microns for a cobalt-based Fischer-Tropsch catalyst. Thus, in the case of an iron-based catalyst, catalyst particles larger than 25 microns are filtered out in the primary filtration stage and form the cake on the filtering medium; catalyst particles having sizes in the range 1 micron to 25 microns are then considered near-size catalyst particles, while those smaller than 1 micron are fine catalyst particles. The near-size catalyst particles, in the case of an iron-based catalyst, tend to settle slowly and move with the liquid product; these particles are hard and do not fragment readily. The fine catalyst particles are significantly smaller than the controlling dimension; they do not settle and remain with the liquid product.

When using catalyst particles that are physically strong or attrition resistant, eg supported cobalt catalyst particles, it is important to ensure that the slurry bed at all times does not contain an appreciable proportion of catalyst particles of a size close to the controlling dimension aperture or opening size of the filtering medium, ie near gap-size particles, since such sized particles can cause permanent blockage of the filtering medium. Thus, the proportion of near-size catalyst particles in the catalyst inventory of the slurry bed, will normally be less than 18 vol %, typically less than 4 vol %, and can even be less than 2 vol %.

Any suitable filtering medium can, at least in principle, be used in the primary filtration stage. Typically, substantially all the filtering openings of the filtering medium will normally be of nominally the same size and have the same geometry. The filtering medium may be part of a filter cartridge or element mounted in the vessel, and may be of a type which is of elongate form, with the filtering medium being of cylindrical form and enclosing a filtrate collecting zone, and with a filtrate outlet for withdrawing filtrate, ie liquid product, being provided at one end thereof. Thus, the filtering medium can be that of a candle filter. While, in principle, the filtering medium can be any desired filtering medium having filtering openings with a controlling dimension of x microns, it is preferably of a type or construction so that permanent clogging or impregnation thereof with the catalyst particles does not readily occur. Thus, the filtering medium can be a mesh, eg a woven mesh; a porous material such as a ceramic material; a perforated sheet; spiral wire wound, eg from wedge wire; or the like.

By 'controlling dimension' in respect of the filtering openings is meant the dimension thereof that determines the maximum catalyst particle size that can pass through the openings. The controlling dimension may, for example, be obtained from the filter manufacturer's specification. Thus, it may be the upper tolerance level, or it may be the average opening or gap size added to a factor of, eg three times, the gap size standard deviation.

The filtering openings may thus be of any desired shape. In one embodiment, the filtering medium openings, when seen in the direction of liquid flow through the openings, may be circular; the controlling dimension of each opening is then its diameter. Instead, in another embodiment, the filtering medium openings, when seen in the direction of liquid flow through the openings, may be more-or-less rectangular so that the width of each opening is shorter than its length; the controlling dimension of each opening is then its width.

In one embodiment of the invention, the primary filtration stage may be located externally, ie outside the slurry bed, eg outside the reactor. However, in another embodiment of the invention, the primary filtration stage may be located internally, ie inside the slurry bed.

When the primary filtration stage is located internally, a plurality of the filter elements, located at the same or different levels within a filtration zone, may be provided. The filtration zone may be provided anywhere below the upper surface of the slurry bed. The filter elements may be arranged in a plurality of banks, with each filter bank comprising a number of the filter elements.

In principle, the elements can be located at any desired inclination; however, they are preferably located vertically with their liquid product or primary filtrate outlets directed downwardly.

The passage of the liquid product through the filtering media may be effected by applying a pressure differential across the filtering media and any cake build-up thereon. Preferably this pressure differential may be up to 8 bar, and is typically in the region of between 1 and 4 bar. The pressure differential may be effected by withdrawing the primary filtrate into a primary filtrate collection vessel which is at a lower pressure than the reactor vessel, with the filtrate outlets of the filter elements being connected to the primary filtrate collection vessel by means of suitable liquid product conduits. The conduits may include a first filtrate conduit leading from the filtrate outlet of each filter element; a second filtrate conduit into which the first conduits of all the filter elements of the particular bank of filter elements tie; and a third filtrate conduit leading to the primary filtrate collection vessel, with the second conduits all tying into the third conduit.

The secondary filtration stage will normally be located outside the reactor. The secondary filtration stage may be provided by any filtration means capable of removing the near-size catalyst particles. Typically, it may be provided by a pressure leaf filter, in particular a vertically or horizontally orientated pressure leaf filter.

Suspensions containing fine particulate material that readily blocks the openings in a filter medium can be filtered to lower (impurity/particle concentrations) levels by inclusion of inert, readily filterable granular filter aid materials. Examples of inert filter aid materials are highly porous diatomaceous silica, powdered glass, Fuller's earth etc. The filter aid is pre-coated onto the thin vertically or horizontally orientated leaves or screens of the pressure leaf filter. The pre-coat is usually achieved by continuously recycling clean filtrate, to which filter aid has been added, until all the filter aid has formed a porous cake on the screen. The cake is permeable to the liquid feed but acts as a depth filter to the fine particulate material, preventing their passage through the filter aid micro-channels and the support screens. Once a predetermined pressure drop over the pre-coat filter is achieved, due to blocking of the micro-channels by the solid impurities, the cake is removed from the screen by means of a mechanical action, eg by rotary, shaking, tapping or hammering action. The 'dirty' filter cake is removed, for example, through a slide valve at the bottom of a conical vessel, for disposal or reclamation.

Any catalyst particles still present in the secondary filtrate are thus fine catalyst particles, and are, as hereinbefore described, typically smaller than 1 micron. Pressure leaf filters will remove substantially all near-size particles, for both Fe and Co catalysts.

A secondary filtrate collection vessel may be provided downstream of the secondary filtration stage.

The backflushing may be effected for at least portions of the periods that the liquid product passage through the filtering medium of the primary filtration stage is interrupted.

The backflushing may, in general, be effected in pulse-like fashion. Thus, the backflushing may comprise an initial pulse of flushing liquid, optimally followed by one or more further pulses of flushing liquid. Each backflushing pulse may comprise initiating backflushing rapidly, ie commencing flow of flushing liquid rapidly; and backflushing the filter elements rapidly with a volume of the flushing liquid. This volume of flushing liquid, for the initial pulse, may be relatively large. For example, in one embodiment of the invention, the volume of flushing liquid may then, for the initial pulse be approximately equivalent to the internal volume of the filter elements. However, in another embodiment of the invention, an even larger volume of flushing liquid can be used for the initial pulse, eg more than three times the combined internal volume of the filter elements being backflushed. The nature of any further backflushing pulses that are used, may be similar to that of the initial pulse hereinbefore described. The volume of flushing liquid used during any further backflushing pulse may be similar to, or smaller than, that of the initial backflushing pulse.

However, the volume of flushing liquid used during the initial backflushing pulse can, in certain cases, be less than the internal volume of the filter elements, eg less than half their internal volume. The volume of flushing liquid used during a further or second pulse may then be similar to that of the initial pulse. The nature of any further pulses, when utilized, and the volume of the flushing liquid used during such pulses, may be similar to those of the second pulse.

The pressure differential across the filtering media and filter cake during backflushing may be up to 10 bar depending on the degree of clogging or age of the filtering media, and is typically at least 1 bar higher than the filtration pressure differential.

The flushing liquid flow rate may be at least 6000 l/h/m² of filtering media. Thus, the flushing liquid flow rate may be about 6000 l/h/m² of filtering media when the pressure differential across the filtering media is about 5 bar, and between about 10000 and 12000 l/h/m² when the pressure differential is about 10 bar.

The process preferably includes subjecting the filtering elements to a waiting period during which no filtering or backflushing takes place, ie during which there is no liquid flow through the filtering media of the elements, to enhance subsequent filtration. The waiting period may be up to 60 minutes, or even longer, but is typically less than 30 minutes, and can even be less than 1 minute.

The backflushing may be effected in a similar manner, and using similar backflushing means, as described in ZA 94/0582//U.S. Pat. Nos. 5,599,849/5,844,006, which are hence incorporated herein by reference. Thus, backflushing may be effected by propelling or forcing residual liquid product, ie primary filtrate, in the conduits, as well as secondary filtrate, back through the filter elements in the second direction, preferably also through a restriction orifice located in the primary conduit of each filter element, by means of pressurized gas. It has been found that cleaning of the filter element surfaces is considerably improved, thus enhancing subsequent filtering performance thereof, when backflushing is effected for at least a sufficiently long period of time to displace substantially all the residual liquid product, ie primary filtrate, from the filter elements, and to ensure that substantial backflushing of the filter elements with secondary filtrate containing no near-size catalyst particles, takes place. As hereinbefore indicated, this can be achieved if backflushing is effected for a sufficiently long period of time so that the total volume of the flushing liquid (primary plus secondary filtrate) is in excess of three times the combined internal volume of all the filter elements being backflushed.

The filtrate conduits and the secondary filtrate collection vessel thus form part of backflushing means, with the secondary filtrate collection vessel also constituting a flushing liquid vessel and some of the filtrate conduits constituting flushing conduits. Naturally, if desired, the backflushing means may instead comprise a separate system or arrangement of flushing conduits, which connects the secondary filtrate collection vessel to the filter elements, for delivering secondary filtrate flushing liquid to the filter elements.

Irrespective of the backflushing means used, a portion of the initial backflushing liquid that passes through the filter elements in the second or reverse direction will consist of residual primary filtrate present in the filter elements and in any conduits common to filtration and backflushing at the time that switch-over from filtration to backflushing is effected. However, this residual primary filtrate naturally collects in the filter elements and conduits immediately prior to the interruption in filtration, ie at a time when a substantial filter cake has already formed on the filtering medium of each filter element. Such filter cake aids filtration and the likelihood of near-size catalyst particles being present in the residual primary filtrate at the end of a filtration run is therefore smaller than is the case for primary filtrate generated at the start of a filtration run. In addition, the volume of flushing liquid, ie the duration of backflushing, is selected so that a substantial portion of the backflushing liquid consists of secondary filtrate containing no near-size particles.

The backflushing means may include at least one quick opening valve or the like, for effecting the backflushing pulses, in one of the flushing conduits; and pressurizing means for pressurizing the flushing liquid vessel. Thus, backflushing may be effected by pressurizing the flushing liquid vessel when the vessel contains secondary filtrate, and then actuating the quick opening valve until the desired volume of flushing liquid has passed through the filter elements of a bank of the filter elements in the second direction. Instead of utilizing a pressurized flushing liquid vessel, a pump can be used for supplying the flushing liquid to the filter elements.

To inhibit settling of catalyst particles in the slurry bed, the process may include agitating the slurry in the slurry bed. The agitation may include allowing slurry in the slurry bed to pass downwardly from a high level to a lower level, through at least one downcomer. Preferably, the slurry may be allowed to pass downwardly through at least one downcomer located in a first downcomer region of the slurry bed, as well as through at least one further downcomer located in a second downcomer region of the slurry bed, with the second downcomer region being spaced vertically with respect to the first downcomer region, so as to redistribute the catalyst particles within the slurry bed, as taught in ZA 98/5992//PCT/GB98/02070 which is hence incorporated herein by reference. Thus, the downcomer(s) serve(s) to impart a net upward liquid velocity to the slurry bed in the regions of the slurry bed outside the downcomers thereby maintaining the catalyst in near uniform suspension.

The process may include operating the column such that the slurry bed is in a heterogeneous or churn-turbulent flow regime and comprises a dilute phase consisting of fast-rising large bubbles of gaseous reactants, and possibly gaseous products which traverse the reaction zone or slurry bed virtually in a plug flow manner and a dense phase comprising liquid phase, ie liquid product, solid catalyst particles and entrained smaller bubbles of gaseous reactants and gaseous product.

By passing or recirculating some of the slurry through the downcomers, more uniform redistribution of the catalyst in the slurry bed is achieved, than is the case without such downcomers. The catalyst particles in the slurry bed are thus maintained in suspension by the turbulence created by the synthesis gas stream passing through the slurry bed combined with an upward liquid velocity induced by the presence of the downcomers. It was found that the use of downcomers to keep the catalyst particles in uniform suspension, avoids the problem of catalyst settling when selecting the optimum catalyst particle size distribution.

The invention will now be described by way of example with reference to the accompanying drawings.

Figure 1:
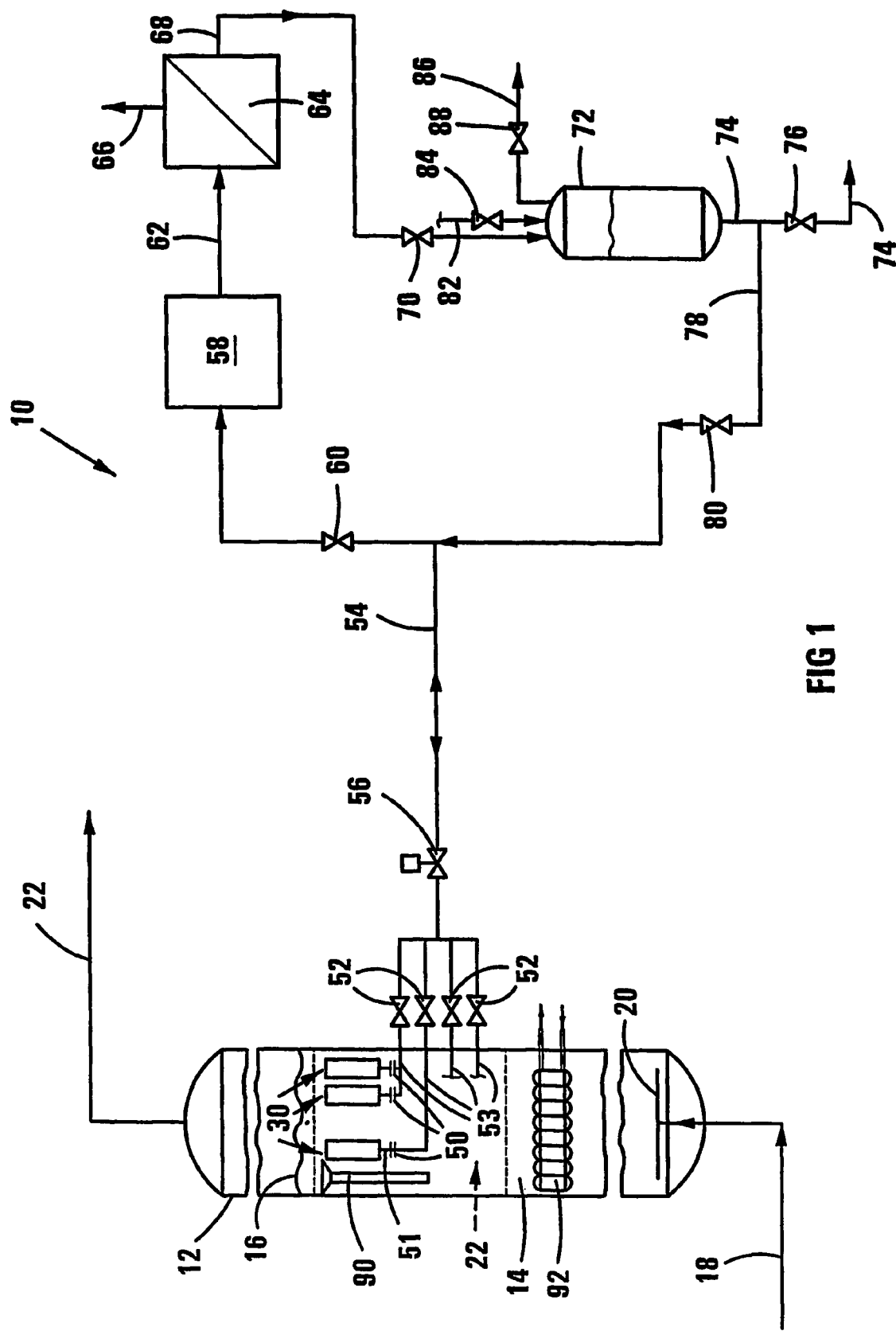
FIG. 1 shows a simplified flow diagram of a process according to the invention for producing liquid and gaseous products from gaseous reactants.
Figure 2:
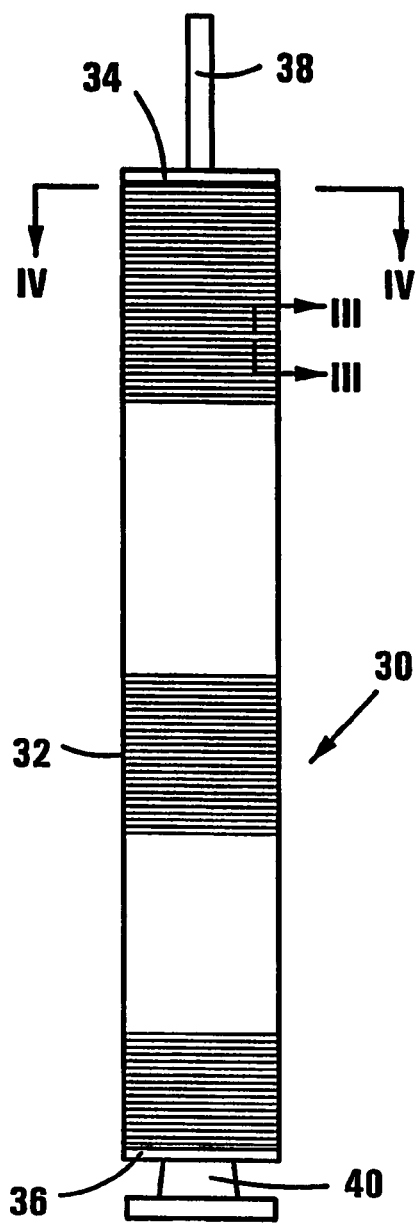
FIG. 2 shows an enlarged side view of one of the filter elements shown in FIG. 1.
Figure 3:
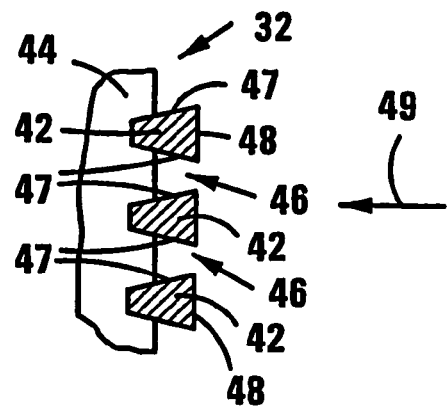
FIG. 3 shows, in part, an enlarged sectional view through III-III in FIG. 2.
Figure 4:
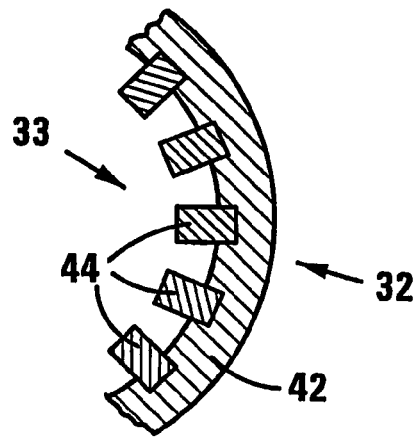
FIG. 4 shows, in part, a sectional view through IV-IV in FIG. 2.

In the drawings, reference numeral 10 generally indicates a process according to the invention for producing liquid and gaseous products from gaseous reactants.

The process 10 includes an upright cylindrical Fischer-Tropsch synthesis slurry phase reactor vessel 12.

The vessel 12 provides a slurry bed zone normally containing a slurry bed 14 of catalyst particles suspended in liquid product and through which gas is passing, as described in more detail hereunder. The slurry bed 14 has an upper surface 16. The expanded height of the slurry bed 14, while gas passes through it, is typically between 14 and 18 m when the total reactor length is about 24 m.

A synthesis gas flow line or conduit 18 is connected to a gas distributor 20 provided at the bottom of the vessel 12, while a gas withdrawal flow line or conduit 22 leads from the top of the vessel 12.

The process 10 also includes a plurality of candle filter elements 30 (only some of which are shown) located in a filtration zone 22 within the slurry bed 14, arranged in a plurality of banks. Each filter element 30 is of elongate cylindrical form, and comprises a cylindrical filtering medium 32 enclosing a filtrate or liquid collecting zone 33. The medium 32 is located between an end plate 34 and a support ring 36. A mounting rod 38 protrudes from the end plate 34, while a flanged liquid outlet 40 is provided on the support ring 36. Thus, by means of the outlet 40, primary filtrate or liquid product can be withdrawn from the collecting zone of the element or cartridge 30. The elements 30 are mounted in position in the vessel 12 by means of the rod 38 and flanged outlets 40. This mounting is not shown in detail in the drawings, but is typically effected by connecting the rod 38 to a lattice or grid spanning the vessel 12, while the outlet is connected to a conduit as hereinafter described.

The filtering medium 32 comprises a spiral wound wire 42 embedded in, or attached to, circumferentially spaced elongate supports 44 extending between the end plates 34, 36. Filtration openings or slots 46 are thus provided between adjacent loops of the wire 42. The wire 42 has, adjacent the openings or slots 46, surfaces 47 which taper away from each other, in the direction of the collecting zone. The wire 42 thus also has surfaces 48 against which a cake of catalyst particles (not shown) will form, as described in more detail hereunder, when liquid product is filtered by the elements 30 as it passes through the slots 46 in the direction of arrow 49. As a result of the tapering surfaces 47, solid catalyst particles will not readily permanently clog or impregnate the openings or slots 46 when filtered product passes through in the direction of arrow 49.

Typically, the filter elements 30 have an external diameter of 2 to 12 cm, with the wire 42 being of stainless steel. The width of the wire 42 at its base is typically about 1.2 mm, but preferably is 0.8 mm or 0.5 mm. This ensures a lower variation in the width of the slots and reduces the number of openings in excess of the average slot width. The average widths of the slots or openings 46 are typically from 10 to 25 microns, but preferably are not greater than 20 microns. This reduces the possibility of the controlling dimension of a filter being greater than desired. A catalyst content of 10 ppm or less in the filtered wax can thereby be achieved. The greater the variation in the gap size and the greater the maximum opening of any filter gap, the greater the possibility of particles larger than the average gap size passing through the filter media. Those versed in the art of filtration know that this will reduce the separation efficiency of the filtration system. It was found that this variation also increased the potential for blinding of the filters during backflushing due to the hard nature of Fischer-Tropsch catalysts in general, and of the proprietary cobalt Fischer-Tropsch catalyst in particular. The near gap size hard catalyst particles can become irreversibly lodged in the backflush side of the filter media.

Instead of the filter elements 30, any other suitable elongate filter elements or cartridges, such as ceramic or sintered metal filter elements, can be used.

The filtration zone 22 is preferably located at a high enough level within the slurry bed, so that the filter elements 30 are located outside the zone of settled catalyst if the gas supply 18 is interrupted. As a result, they will not be embedded in settled solids or catalyst on slumping of the bed 14. However, it has been found that the filtration zone 22 need not necessarily be located near the top of the slurry bed 14 but can instead be located lower down since, should such bed slump occur, it has been found permanent clogging of the filter elements 30 will still not readily occur even if the elements are completely surrounded by settled solids or catalyst. The filter elements 30 are preferably located at a low enough elevation so that they remain submerged in liquid and are not exposed to gas if the gas supply is interrupted, but filter exposure is acceptable if the filter surface is shaped so as to avoid catalyst laydown.

The elements 30 are preferably located with their outlets 40 directed downwardly so that any solid or catalyst fines which pass through the slots 46 with the filtrate (liquid product) will tend to collect in the bottom of the collection zones of the filter elements 30 from where they will be washed out with the liquid product.

To the outlet 40 of each of the filter elements 30 is connected a primary conduit 51, fitted with a restriction orifice 50. The conduits 51 of all the filter elements 30 making up a bank of the elements tie into a common secondary conduit 53 fitted with a shut-off valve 52. All the conduits 53 tie into a common tertiary conduit 54, fitted with a quick opening valve 56.

The conduit 54 leads into a primary filtrate blowdown vessel or drum 58 and is provided with a shut-off valve 60. A conduit 62 leads from the drum 58 to a secondary filtration stage 64 comprising horizontally orientated pressure leaf filters, such as Schenk™ filters. A residue withdrawal line 66 leads from the stage 64 as does a secondary filtrate withdrawal line 68. The line 68 is fitted with a shut-off valve 70.

The conduit 68 leads into the top of a secondary filtrate blowdown vessel 72. A liquid rundown conduit 74, fitted with a shut-off valve 76, leads from the bottom of the vessel 72. A liquid backflush conduit 78, fitted with a shut-off valve 80, leads from the conduit 74, upstream of the valve 76, back to the conduit 60, between the valves 56, 60.

A pressurizing gas conduit or line 82, fitted with a control valve 84, leads into the top of the vessel 72, while a vent conduit or line 86, fitted with a control valve 88, leads from the top of the vessel 72.

Instead of the pressurizing conduit 82 being provided, a pump (not shown) may be provided in the conduit 78.

The column 12 includes at least one downcomer 90. A cooling coil 92 is also provided below the downcomer 90.

If desired, the downcomer 90 may be provided in a first downcomer region, with the column 12 also including a second downcomer region (not shown), spaced with vertical clearance from the first downcomer region. At least one downcomer (not shown) will then be provided in the second downcomer region, with this downcomer not being aligned axially with the downcomer 90.

In use, synthesis gas, comprising mainly carbon monoxide and hydrogen, enters the reactor vessel 12 along the flow line 18. The gas flow rate to the vessel 12 is such as to give a superficial gas velocity in the filtration zone 22, based on the open cross-sectional area of the filtration zone, of between 5 and 70 cm/s, typically about 30 to 40 cm/s.

The slurry bed 14 is maintained in the reactor vessel 12. The slurry bed 14 comprises catalyst particles suspended in liquid product, ie liquid wax produced in the vessel 12 on reaction of the gaseous reactants. The catalyst particles are maintained in suspended state in the slurry bed 14, and in particular in the filtration zone 22, by means of the turbulence created therein by the gas passing upwardly therethrough. It is believed that this turbulence also inhibits excessive cake build-up on the filtering media, and thus enhances filtration through the media.

The vessel 12 is typically maintained at an operating pressure of between 20 bar and 30 bar, typically about 25 bar, and at an operating temperature between 180° C. and 260° C., typically between about 220° C. and about 240° C.

However, the operating pressure can be in excess of 25 bar, and the operating temperature higher than 240° C. or lower than 220° C., as hereinbefore described, depending on the nature and spread of gaseous and liquid products required and the type of catalyst used. Naturally, the vessel 12 will be provided with suitable temperature control means, such as the cooling coil 92 for controlling the reaction temperatures, as well as suitable pressure control means such as a pressure control valve.

In the vessel 12, as the synthesis gas passes through the slurry bed 14, the carbon monoxide and hydrogen react to form a range of products in accordance with known Fischer-Tropsch reactions. Some of these products are in gaseous form at the operating conditions of the vessel 12 and are withdrawn, together with unreacted synthesis gas, along the flow line 20. Some of the products produced, such as the waxes already mentioned, are in liquid form at the operating conditions of the vessel 12, and act as the suspension medium for the catalyst particles. As liquid product is formed, the level 16 of the slurry bed naturally rises, and the liquid product is thus withdrawn in the filtration zone by means of the filter elements 30 and rundown vessel 58 to maintain the slurry bed level. This internal filtration constitutes a first stage of the operating cycle of the filter elements 30.

The catalyst used is typically an iron- or cobalt-based catalyst, and a product mixture comprising liquid product and catalyst particles having a range of sizes is formed in the slurry bed. For an iron-based catalyst, the controlling dimension of the filtering medium of the filter elements 30 is typically 25 microns. The product mixture will then contain large catalyst particles having a dimension, eg diameter, greater than x microns, near-size catalyst particles being from 1 to 25 microns in size, and fine catalyst particles smaller than 1 micron. The large catalyst particles will thus not pass through the filtering openings 46 of the filter elements and will build up as a cake on the outside of the filter elements. Primary filtrate comprising liquid product, near-size catalyst particles and fine particles, will pass through the filtering openings and, by means of the conduits 53 and 54, into the vessel 58. From there it passes through the secondary filtration stage 64 where the near-size particles are removed from the liquid product. Secondary filtrate comprising liquid product and fine catalyst particles passes from the secondary filtration stage 64, by means of the line 68, into the vessel of drum 72.

The vessel 72 is maintained, by means of pressurizing gas introduced along the line 82, at elevated pressure, which is, however, lower than that in the vessel 12. Typically the pressure in the vessel 72 is set such that the pressure differential across the filtering media of the filtering elements 30 and any filter cake build up thereon, is about 2 to 4 bar.

In this fashion, a relatively constant slurry bed level in the reactor is maintained. However, when the filter cake has built up to some thickness, it must then be backflushed from the filtering media, in a second stage of the operating cycle of the filter elements 30. The backflushing is effected by shutting the quick opening valve 56 and the valve 60. The pressure in the vessel 72 is then increased, by means of the gas pressurizing line 82, to a pressure greater than the operating pressure in the vessel 12. As a result of the static head of liquid (wax) in the rundown conduits, the liquid pressure at the quick opening valve 56 is typically slightly lower than the pressure in the vessel 72, but still sufficient for backflushing. The vessel 72 will thus contain secondary filtrate.

Backflushing is effected in pulse-like fashion on one bank of filter elements 30 at a time, using secondary filtrate from the vessel 72. Thus, during backflushing, one of the valves 52 will be open, with the remaining valves 52 closed. The valve 80 will be open. In a first backflushing step, the quick opening valve 56 is opened rapidly in less than 0.8 seconds; a volume of secondary filtrate, typically at least equivalent to the internal volume of the filter elements 30 making up the bank of elements being flushed, and more preferably more than three times the combined internal volume of the filter elements 30 being backflushed, is allowed to pass from the vessel 72; this secondary filtrate flows through the backflushing conduit 78, and the conduits 54, 53 and 51, and constitutes flushing liquid which passes through the bank of elements 30 in a second direction opposite to the direction in which the product flows during filtering. This typically takes up to 30 seconds. Thereafter, the quick opening valve 56 is again shut.

If a second backflushing step is desired, the vessel 72 is then again repressurized. In a second pulse-like backflushing step, the quick opening valve 56 is again opened rapidly for a second time. The valve 56 is thereafter again closed. If desired, at least one further similar backflushing step can be effected on that particular bank of filter elements.

The remaining banks of elements can then similarly be backflushed, by opening and closing the appropriate valves 52.

Thereafter, in a third stage of the operating cycle of each bank of filter elements 30, the filter elements are subjected to a waiting period in which no liquid passes through them. The Applicant has found that the filtration rate, when the filter elements 30 are then thereafter again subjected to filtration as hereinbefore described, increases with an increase in the duration of the waiting or non-active period. However, this must be balanced against the disadvantage that the filter elements are out of service during these waiting times. It has been found that a waiting period of between 10 and 30 minutes gives good results. However, the waiting period can also be shorter than 10 minutes. It is believed that, during this waiting period, catalyst cake which has been loosened from the filter media of the elements 30 and partially broken up during the backflushing stage, is effectively broken up further, removed from the filter media surfaces and re-mixed remotely from the filters 30, by means of the turbulence within the slurry bed 14. It is believed further that the gas superficial velocity through the filtration zone 22 may influence the optimum duration of the waiting period.

Some slurry continuously passes downwardly through the downcomer 90, thereby to achieve uniform redistribution of catalyst particles within the slurry bed 14, and also to ensure uniform heat distribution throughout the slurry bed, as also described in more detail hereunder.

The vessel or column 12 is operated so that the slurry bed 14 thereof is in a heterogeneous or churn-turbulent flow regime and comprises a dilute phase consisting of fast-rising larger bubbles of gaseous reactants and gaseous product which traverse the slurry bed virtually in plug flow fashion, and a dense phase which comprises liquid product, solid catalyst particles and entrained smaller bubbles of gaseous reactants and gaseous product.

The vessel 72, the gas pressurizing line 82, the conduits 74, 78, 54, 53 and 51 and the valves 80, 56 and 52 thus together constitute backflushing means. However, it is to be appreciated that instead of using, for backflushing, the conduits 54 and 53 and the valves 56 and 52 which are used for filtration, a separate or dedicated backflushing conduit arrangement (not shown) connecting the vessel 72 to the filter elements 30, and associated valves, can be provided. Still further, if desired, instead of the backflushing vessel 72 being used for backflushing, the backflushing means may include a separate backflushing vessel (not shown) connected to the conduits 74, 78 etc or to the dedicated backflushing conduit arrangement, with the separate backflushing vessel then containing secondary filtrate, for example secondary filtrate obtained from earlier filtration runs or from a separate similar process.

The Applicant has found that when the filter elements of a primary filtration stage are backflushed with primary filtrate, ie primary filtered wax, to remove cake formation thereon, blockage of the filters from the inside can result. This is as a result of the presence of near-size catalyst particles and fine catalyst particles in the primary filtrate. This type of blockage is irreversible and is caused by the presence of the near-size catalyst particles in the primary filtrate or even by the fine catalyst particles, if present in the primary filtrate in large quantities.

The present invention thus provides a means for overcoming this problem, since the near-size catalyst particles are removed from the primary filtrate in the secondary filtration stage 64.

The invention claimed is:

1. A process for producing liquid and, optionally, gaseous products from gaseous reactants, which process includes
feeding, at a low level, gaseous reactants into a slurry bed of solid catalyst particles suspended in a suspension liquid;
allowing the gaseous reactants to react as they pass upwardly through the slurry bed, thereby to form liquid and, optionally, gaseous products, with the reaction being catalyzed by the catalyst particles and with a product mixture comprising liquid product and catalyst particles having a range of sizes, being formed;
subjecting, in a primary filtration stage, the product mixture to primary filtration by passing the liquid product through a filtering medium having a plurality of filtering openings through which the liquid product passes, with the liquid product passing through the filtering openings in a first direction and with the filtering openings having a controlling dimension of x microns, so that large catalyst particles having a particle size greater than x microns are separated from the liquid product, thereby to obtain a primary filtrate comprising liquid product, near-size catalyst particles that range in size from 1 micron to x microns, and fine catalyst particles that are smaller than 1 micron;
subjecting, in a secondary filtration stage, the primary filtrate to secondary filtration to separate the near-size catalyst particles and, optionally, some of the fine catalyst particles, from liquid product, thereby to obtain a secondary filtrate comprising liquid product and fine catalyst particles;
allowing a cake of catalyst particles to build up on the filtering medium in the primary filtration stage;
from time to time interrupting the passage of liquid product through the filtering medium in the primary filtration stage; and
backflushing the filtering medium by passing secondary filtrate, as a flushing liquid, through the filtering medium in a second direction, opposite to the first direction, for at least portions of the periods that the liquid product passage is interrupted, thereby to dislodge the cake from the filtering medium.

2. A process as claimed in claim 1, wherein the suspension liquid is liquid product.

3. A process as claimed in claim 2, wherein the gaseous reactants are in the form of a synthesis gas stream comprising mainly carbon monoxide and hydrogen, with both liquid and gaseous hydrocarbon products being produced by Fischer-Tropsch synthesis, and with the catalyst particles thus being Fischer-Tropsch catalyst particles.

4. A process as claimed in claim 3, wherein the slurry bed is provided in a vessel, with unreacted reactants and gaseous product being withdrawn from the vessel above the slurry bed, and with the vessel being maintained at Fischer-Tropsch synthesis pressure and temperature conditions.

5. A process as claimed in claim 4, wherein the catalyst is an iron-based or a cobalt-based Fischer-Tropsch catalyst.

6. A process as claimed in claim 5, wherein the catalyst is an iron-based Fischer-Tropsch catalyst, with the controlling dimension of the filtering openings being 25 microns, with catalyst particles larger than 25 microns being filtered out in the primary filtration stage and forming the cake on the filtering medium, and with catalyst particles having sizes in the range 1 micron to 25 microns being near-size catalyst particles, while those smaller than 1 micron are fine catalyst particles.

7. A process as claimed in claim 5, wherein the catalyst is a cobalt-based Fischer-Tropsch catalyst, with the controlling dimension of the filtering openings being 10 microns.

8. A process as claimed in any of claims 4 to 7 wherein the filtering medium is part of a filter element which is mounted inside the vessel and is of elongate form, with the filtering medium being of cylindrical form and enclosing a filtrate collecting zone, and with a filtrate outlet for withdrawing filtrate being provided at one end of the filter element.

9. A process as claimed in claim 8, wherein the primary filtration stage is located inside the slurry bed.

10. A process as claimed in claim 9, which includes providing a plurality of the filter elements, located at different levels within a filtration zone below the upper surface of the slurry bed.

11. A process as claimed in claim 10, wherein the passage of the liquid product through the filtering media is effected by applying a pressure differential across the filtering media and any cake build-up thereon.

12. A process as claimed in claim 11, wherein the pressure differential is effected by withdrawing the primary filtrate into a primary filtrate collection vessel which is at a lower pressure than the vessel, with the filtrate outlets of the filter elements being connected to the primary filtrate collection vessel by means of liquid product conduits.

13. A process as claimed in claim 11, wherein the secondary filtration stage is located outside the vessel.

14. A process as claimed in claim 13, wherein the secondary filtration stage is provided by a vertically or horizontally orientated pressure leaf filter.

15. A process as claimed in claim 13, wherein the secondary filtration stage includes filterable granular filter aid material.

16. A process as claimed in any one of claim 11, wherein the backflushing is effected for at least portions of the periods that the liquid product passage through the filtering media of the primary filtering stage is interrupted.

17. A process as claimed in claim 16, wherein the backflushing is effected in pulse-like fashion.

18. A process as claimed in claim 17, wherein the backflushing comprises an initial pulse of flushing liquid, followed by one or more further pulses of flushing liquid, with each backflushing pulse comprising initiating backflushing rapidly, and backflushing the elements rapidly with a volume of the flushing liquid.

19. A process as claimed in claim 18, wherein the volume of flushing liquid used during the initial pulse is at least three times the internal volume of the filter elements.

20. A process as claimed in claim 19, wherein the volume of flushing liquid used during a second pulse is less than that used during the initial pulse.

21. A process as claimed in claim 10, wherein the pressure differential across the filtering media and filter cake during backflushing is up to 10 bar depending on the degree of clogging or age of the filtering media.

22. A process as claimed in claim 10, wherein the flushing liquid flow rate is at least 6000 l/h/$M^2$ of filtering media.

23. A process as claimed in claim 10, which includes subjecting the filter elements to a waiting period during which no filtering or backflushing takes place, so that there is then thus no liquid flow through the filtering media of the elements, to enhance subsequent filtration.

24. A process as claimed in claim 8, which includes agitating the slurry in the slurry bed, to inhibit settling of catalyst particles.

25. A process as claimed in claim 24, wherein the agitation includes allowing slurry in the slurry bed to pass downwardly from a high level to a lower level, through at least one downcomer.

26. A process as claimed in claim 25, which includes operating the vessel such that the slurry bed is in a heterogeneous or churn-turbulent flow regime and comprises a dilute phase consisting of fast-rising large bubbles of gaseous reactants, and possibly gaseous products, which traverse the reaction zone or slurry bed virtually in a plug flow manner, and a dense phase comprising liquid product, solid catalyst particles and entrained smaller bubbles of gaseous reactants and gaseous product.

* * * * *